(12) United States Patent
Perander et al.

(10) Patent No.: US 6,218,322 B1
(45) Date of Patent: Apr. 17, 2001

(54) MINERAL FIBRE

(75) Inventors: Michael Perander, Pargas; Jan Hakala, Turku, both of (FI)

(73) Assignee: Partex Paroc Oy AB, Helsinki (FI)

( * ) Notice: Subject to any disclaimer, the term of this patent is extended or adjusted under 35 U.S.C. 154(b) by 0 days.

(21) Appl. No.: 09/380,778

(22) PCT Filed: Mar. 10, 1998

(86) PCT No.: PCT/FI98/00208

§ 371 Date: Sep. 9, 1999

§ 102(e) Date: Sep. 9, 1999

(87) PCT Pub. No.: WO98/40321

PCT Pub. Date: Sep. 17, 1998

(30) Foreign Application Priority Data

Mar. 10, 1997 (FI) ......................................... 970992

(51) Int. Cl.$^7$ ....................................... C03C 13/06
(52) U.S. Cl. .................................. 501/36; 501/35
(58) Field of Search .......................... 501/35, 36

(56) References Cited

U.S. PATENT DOCUMENTS

| 5,250,488 |   | 10/1993 | Thelohan et al. | 501/36 |
| 5,583,080 |   | 12/1996 | Guldberg et al. | 501/36 |
| 5,843,854 | * | 12/1998 | Karppinen et al. | 501/36 |
| 6,037,284 | * | 3/2000  | Holstein et al. | 501/35 |
| 6,077,798 | * | 6/2000  | Rapp | 501/36 |

FOREIGN PATENT DOCUMENTS

| 905797 | 12/1994 | (FI) . |
| 2 301 351 | 12/1996 | (GB) . |
| WO 94/14718 | 7/1994 | (WO) . |

* cited by examiner

*Primary Examiner*—Karl Group
(74) *Attorney, Agent, or Firm*—Armstrong, Westerman Hattori, McLeland & Naughton

(57) ABSTRACT

The invention concerns a mineral fibre having the following composition in % by weight: $SiO_2$ 50–60, $Al_2O_3$ 1–6, MgO 16–22, CaO 12–18, $Na_2O+K_2O$ 0–3, $Fe_2O_3$ 1–8, $P_2O_5$ 1–6, other 0–3, whereby the weight ratio CaO/MgO<1 and the sum CaO+MgO=30–38% by weight.

10 Claims, No Drawings

MINERAL FIBRE

The present invention concerns mineral fibres.

Mineral fibres made by melting and centrifuging of mineral raw materials, such as rock, slag or similar material, are extensively used for the manufacture of mineral fibre mats and blankets, especially for heat and sound insulation purposes in the construction industry. Consequently a mat of this kind should above all exhibit good insulating properties against heat and sound. In addition, the mat should advantageously exhibit good strength and elasticity, as well as a good temperature resistance. For primarily production economical reasons, it is also important that the mineral melt has an advantageous production technical composition, for example good fiberizability.

A wide range of insulation products are available on the market, which products do not only have different heat insulation properties, but also a varying degree of temperature resistance. Temperature resistant mineral fibre products mean products which can resist elevated temperatures during prolonged periods of time without changing shape or dimensions to any appreciable degree. Such products are thus attractive from a fire prevention point of view.

Conventional glass fibre has a temperature resistance of up to appr. 550° C., whereas the temperature resistance of conventional rock wool is better, up to appr. 700° C. However, there is an interest for products with even higher temperature resistance, up to 1100–1200° C., and such products are also available on the market.

In recent times, increased importance has been attached also to the properties of the mat from the point of view of labor hygiene. Thus work has been initiated on developing fibres which have an increased solubility in biological fluids in order to ensure that fibres which during handling of the mineral wool are taken up by the body without being transported out therefrom, disappear by dissolving in the body fluid. Such soluble fibres are described, for example, in the EP-patent EP-B-558 548. These fibres possess, as rock wool fibres in general, an increased calcium oxide content with respect to its magnesium oxide content, as magnesium oxide generally is considered to have an undesired increasing effect and calcium oxide a desired decreasing effect on the melt liquidus temperature.

One aim of the present invention is to modify soluble fibres for example of the type described in the said EP-patent in order to make such fibres more temperature resistant. An object of the invention is also to guarantee that the fibre manufacture can take place in an economically advantageous manner, with maintained or improved glass properties of the melt and a decreased risk for premature solidification, and with a good yield of fibres of good quality, for example longer fibres with maintained fibre diameter and fibres with good strength. Such fibres in turn give a fibre mat with improved stiffness, elasticity and heat resistance.

The above mentioned advantages are achieved with the mineral fibre according to the invention, which in contrast to the fibres according to the EP-B-558 548 contain an increased content of magnesium oxide in relation to the calcium oxide content. It has surprisingly shown that according to the invention, that is with a phosphorus containing fibre with reversed CaO/MgO-ratio, the above mentioned favourable characteristics are achieved, both with respect to fibre manufacture and the fibres obtained and the products made therefrom.

The present invention thus concerns a mineral fibre with the following composition in % by weight

| | |
|---|---|
| $SiO_2$ | 50–60 |
| $Al_2O_3$ | 1–6 |
| MgO | 16–22 |
| CaO | 12–18 |
| $Na_2O + K_2O$ | 0–3 |
| $Fe_2O_3$ | 1–8 |
| $P_2O_5$ | 1–6 |
| other | 0–3 | wherein the weight ratio CaO/MgO<1, and the sum CaO+MgO=30–38% by weight.

The denomination "other" components above encompasses such optional components, especially contaminants, which are of no substantial importance with respect to the properties of the manufactured fibre, such as Ti, Zr, Cr, Mn etc, whereby each individual other component preferably is not present in an amount of more than 1% by weight. In this description, the denomination $Fe_2O_3$ also means bivalent iron FeO.

According to a preferred embodiment, the invention concerns a mineral fibre with substantially the following composition in % by weight

| | |
|---|---|
| $SiO_2$ | 53–58 |
| $Al_2O_3$ | 1–4 |
| MgO | 17–20 |
| CaO | 14–17 |
| $Na_2O + K_2O$ | 0–3 |
| $Fe_2O_3$ | 2–6 |
| $P_2O_5$ | 2–5 |
| other | 0–3 | whereby the weight ratio CaO/MgO<1.

According to a preferred embodiment, the fibre composition contains MgO and CaO in such quantities that the weight ratio CaO/MgO is greater than 0.7, preferably 0.7–0.9. According to a further preferred embodiment, the sum MgO+CaO=30–37% by weight, preferably 32–35% by weight.

According to a further preferred embodiment, the invention concerns a mineral fibre which contain 18–20% by weight MgO, especially 18–19% by weight MgO and 15–16% by weight of CaO. One example of such a fibre has a composition containing substantially in % by weight

| | |
|---|---|
| $SiO_2$ | 54–55 |
| $Al_2O_3$ | 2–4 |
| MgO | 18–20 |
| CaO | 15–16 |
| $Na_2O + K_2O$ | 0–2 |
| $Fe_2O_3$ | 2–4 |
| $P_2O_5$ | 2–4 |
| other | 0–2. |

According to a further embodiment of the invention, a mineral fibre contains substantially in % by weight

| | |
|---|---|
| $SiO_2$ | 53–58 |
| $Al_2O_3$ | 1–4 |
| MgO | 16–19 |
| CaO | 13–16 |
| $Na_2O + K_2O$ | 0–2 |

-continued

| | |
|---|---|
| $Fe_2O_3$ | 4–8 |
| $P_2O_5$ | 1–6 |
| other | 0–2 | whereby the weight ratio CaO/MgO<1 and CaO+MgO≧30.

According to still a further embodiment of the invention, a preferred mineral fibre contains substantially in % by weight

| | |
|---|---|
| $SiO_2$ | 53–56 |
| $Al_2O_3$ | 1–4 |
| MgO | 16–18 |
| CaO | 13–15 |
| $Na_2O + K_2O$ | 0–2 |
| $Fe_2O_3$ | 6–8 |
| $P_2O_5$ | 4–6 |
| other | 0–2 | whereby CaO+MgO≧30.

According to the invention it has been found that by using an increased iron oxide content in the composition, it is possible to increase the service temperature of the fibre product even to values up to and above 1000° C.

The composition according to the invention is prepared in a conventional manner by mixing and melting of suitable raw materials. Such raw materials are for example olivine-serpentine-talcum based minerals, fayalite, kimberlite, peridotite, quartz, quartz sand, diatomite, wollastonite, apatite or synthetic phosphate, cement, lime, low-aluminium slag, etc. The composition according to the invention can be used for manufacturing fibres in a conventional manner, for example by cascade centrifugation of the melt obtained.

The raw materials may be used either as such, ground and sorted in a suitable piece or particle size, or as ready-made briquettes with a suitable composition, used alone or comprising a part of the charge.

The following examples illustrate the invention without restricting the same.

A cupola furnace is charged with raw materials chosen from those listed above in suitable amounts to give the desired composition of the fibre product. Fibres were made from the melt obtained in a conventional manner by cascade centrifugation, which fibres were collected on a conveyor to form a mineral fibre web.

In the following Table, the examples 1–6 indicate compositions for fibres according to the invention, whereas the examples indicated Ref. A, Ref. B and Ref. C are reference compositions.

Ref. A is a rock wool composition with a conventional ratio CaO/MgO, but containing no phosphorus, whereas Ref. B is a rockwool composition with a "reversed" CaO/MgO-ratio, also containing no phosphorus. Ref. C is a rockwool composition with conventional CaO/MgO-ratio which also contains phosphorus.

TABLE

| Composition | Ref. A | Ref. B | Ref. C | 1 | 2 | 3 | 4 | 5 | 6 |
|---|---|---|---|---|---|---|---|---|---|
| $SiO_2$ | 52.0 | 56.0 | 51.0 | 53.7 | 54.5 | 54.3 | 55.7 | 53.7 | 54.3 |
| $Al_2O$ | 3.9 | 2.6 | 2.8 | 2.1 | 3.7 | 2.7 | 2.1 | 2.9 | 1.5 |
| MgO | 14.2 | 17.2 | 14.7 | 16.7 | 19.3 | 18.2 | 19.1 | 18.3 | 18.6 |
| CaO | 22.0 | 15.7 | 18.3 | 13.6 | 15.3 | 15.6 | 14.9 | 16.4 | 13.3 |
| $Na_2O + K_2O$ | 0.9 | 1.0 | 1.0 | 0.5 | 1.0 | 0.5 | 0.4 | 0.7 | 1.3 |
| $Fe_2O_3$ | 5.5 | 6.0 | 6.7 | 7.4 | 2.8 | 4.2 | 3.1 | 2.8 | 6.3 |
| $P_2O_5$ | 0 | 0 | 4.2 | 4.2 | 2.6 | 3.3 | 3.7 | 3.8 | 3.9 |
| Other | 1.0 | 1.5 | 1.3 | 1.8 | 0.8 | 1.2 | 1.0 | 1.4 | 0.8 |
| Sintering temp. ° C. | 1210 | 1270 | 1120 | 1170 | 1170 | 1220 | 1220 | | |
| Max. service temp. ° C. | | | 690 | 1120 | 730 | 750 | 750 | | |
| Dissolution (ng/cm²h) | | 200 | 500 | 580 | | | | | |
| Fibre yield (%) | 45 | | 66 | 67 | 70 | 64 | 68 | | |
| Shot (%) | 10 | | 5 | 3 | 3.5 | 8 | 4 | | |

From the Table it can be seen that when the CaO/MgO-ratio is reversed as compared to the conventional ratio (Ref. A→Ref. B), the sintering temperature of the wool increases, that is its temperature resistance increases. This increase in temperature resistance allows for the inclusion of phosphorus, which has a sintering temperature reducing effect (Ref. A→Ref. C). The addition of phosphorus is needed for increasing the fibre solubility in biological fluids.

By reversing the CaO/MgO-ratio, in accordance with the invention, compositions 1–6, an increase in the temperature resistance can be seen, compared to Ref. C. The difference can be seen in the sintering temperature, but also in the temperature indicating the maximum service temperature. Especially high service temperatures have been obtained for the composition 1 having a high iron content.

The compositions according to the invention also give, as compared for example to composition Ref. A, a significantly better fibre yield and smaller shot content, due to the beneficial effect of phosphorus on the fibre production, as a result of the viscosity increasing effect of phosphorus on the melt. In addition, the fibre compositions containing phosphorus are more soluble than the phosphorus-free compositions (Comp. 1 vs. Ref. B).

What is claimed is:

1. Mineral fibre comprising the following composition in % by weight:

| | |
|---|---|
| $SiO_2$ | 50–60 |
| $Al_2O_3$ | 1–6 |
| MgO | 16–22 |
| CaO | 12–18 |
| $Na_2O + K_2O$ | 0–3 |
| $Fe_2O_3$ | 1–8 |

| | |
|---|---|
| P$_2$O$_5$ | 1–6 |
| other | 0–3 | whereby the weight ratio CaO/MgO<1 and the sum CaO+MgO=30–38% by weight.

2. The mineral fibre according to claim 1, comprising the following composition in % by weight:

| | |
|---|---|
| SiO$_2$ | 53–58 |
| Al$_2$O$_3$ | 1–4 |
| MgO | 17–20 |
| CaO | 14–17 |
| Na$_2$O + K$_2$O | 0–3 |
| Fe$_2$O$_3$ | 2–6 |
| P$_2$O$_5$ | 2–5 |
| other | 1–3. |

3. The mineral fibre according to claim 1 or 2, wherein the composition contains MgO and CaO in such amounts that the ratio CaO/MgO is greater than 0.7.

4. The mineral fibre according to claim 1 or 2, wherein the sum MgO+CaO=30–37% by weight.

5. The mineral fibre according to claim 1 or 2, comprising 18–20% by weight of MgO and 15–16% by weight of CaO.

6. The mineral fibre according to claim 5, comprising in % by weight:

| | |
|---|---|
| SiO$_2$ | 54–55 |
| Al$_2$O$_3$ | 2–4 |
| MgO | 18–20 |
| CaO | 15–16 |
| Na$_2$O + K$_2$O | 0–2 |
| Fe$_2$O$_3$ | 2–4 |
| P$_2$O$_5$ | 2–4 |
| other | 0–2. |

7. The mineral Fibre according to claim 1, comprising in % by weight:

| | |
|---|---|
| SiO$_2$ | 53–58 |
| Al$_2$O$_3$ | 1–4 |
| MgO | 16–19 |
| CaO | 13–16 |
| Na$_2$O + K$_2$O | 0–2 |
| Fe$_2$O$_3$ | 4–8 |
| P$_2$O$_5$ | 1–6 |
| other | 0–2. |

8. The mineral fibre according to claim 7, comprising in % by weight:

| | |
|---|---|
| SiO$_2$ | 53–56 |
| Al$_2$O$_3$ | 1–4 |
| MgO | 16–18 |
| CaO | 13–15 |
| Na$_2$O + K$_2$O | 0–2 |
| Fe$_2$O$_3$ | 6–8 |
| P$_2$O$_5$ | 4–6 |
| other | 0–2. |

9. The mineral fibre according to claim 1 or 2, wherein the composition contains MgO and CaO in such amounts that the ratio CaO/MgO is 0.7–0.9.

10. The mineral fibre according to claim 1 or 2, wherein the sum MgO+CaO=32–35% by weight.

* * * * *

UNITED STATES PATENT AND TRADEMARK OFFICE
CERTIFICATE OF CORRECTION

PATENT NO. : 6,218,322 B1  
DATED : April 17, 2001  
INVENTOR(S) : Perander et al.

Page 1 of 1

It is certified that error appears in the above-identified patent and that said Letters Patent is hereby corrected as shown below:

Title page,
Item [73] Assignee: "Partex Paroc Oy AB" to be -- Paroc Group Oy Ab --

Signed and Sealed this

Eighteenth Day of December, 2001

Attest:

Attesting Officer

JAMES E. ROGAN  
*Director of the United States Patent and Trademark Office*